(12) United States Patent
Todd et al.

(10) Patent No.: US 11,516,243 B2
(45) Date of Patent: Nov. 29, 2022

(54) DATA CONFIDENCE FABRIC TRUST BROKERS

(71) Applicant: EMC IP Holding Company LLC, Hopkinton, MA (US)

(72) Inventors: Stephen J. Todd, Center Conway, NH (US); Jason A. Shepherd, Austin, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 387 days.

(21) Appl. No.: 16/778,785

(22) Filed: Jan. 31, 2020

(65) Prior Publication Data
US 2021/0243218 A1 Aug. 5, 2021

(51) Int. Cl.
*G06Q 10/10* (2012.01)
*H04L 9/40* (2022.01)
*G06F 16/28* (2019.01)

(52) U.S. Cl.
CPC ........ *H04L 63/1433* (2013.01); *G06F 16/288* (2019.01); *G06Q 10/10* (2013.01); *G06Q 2220/00* (2013.01)

(58) Field of Classification Search
CPC ............... H04L 63/1433; H04L 9/3239; H04L 63/0227; H04L 63/1408; H04L 2209/38; H04L 63/12; G06F 16/288; G06Q 10/10; G06Q 2220/00
See application file for complete search history.

(56) References Cited

U.S. PATENT DOCUMENTS

2019/0072320 A1* 3/2019 Devi .................. G06N 7/00
2020/0380860 A1* 12/2020 MacNeille ....... G08G 1/096833

OTHER PUBLICATIONS

Harbor (NPL—IOTA Collaborates With Industry-Leading Organizations on Rebuilding Our Trust in Data, published Oct. 28, 2019, retrieved from https://www.businesswire.com/news/home/20191028005573/en/IOTA-Collaborates-With-Industry-Leading-Organizations-on-Rebuilding-Our-Trust-in-Data retrieved on Apr. 19, 2022 (Year: 2019).*

* cited by examiner

*Primary Examiner* — Michael A Keller
(74) *Attorney, Agent, or Firm* — Workman Nydegger (57) ABSTRACT

A trust broker is disclosed for a data confidence fabric. The trust broker evaluates the trustworthiness of data flowing through a network that includes a data confidence fabric. The trust broker evaluates a baseline confidence score and generates a workorder to improve the baseline confidence score in a measurable way. The trust broker may implement the workorder and ensure that the trust improves in the data confidence fabric.

18 Claims, 4 Drawing Sheets

DATA CONFIDENCE FABRIC TRUST BROKERS

FIELD OF THE INVENTION

Embodiments of the present invention generally relate to data confidence fabrics (DCFs). More particularly, at least some embodiments of the invention relate to systems, hardware, software, computer-readable media, and methods for evaluating, and/or improving trust scores in computing networks.

BACKGROUND

Computing and other electronic devices come in a variety of types and form factors and have varying capabilities. Many of these devices generate data that may be used by various applications. There is often a question, however, about the usefulness of the data. More specifically, the trustworthiness of the data may be difficult to ascertain.

More specifically, many applications are configured to use data that flows through a computing system. The ability of the application to trust the data, is a much larger question. When an entity deploys an application that operates in a computing network and that relies on data generated in that network, any output of the application is necessarily impacted by the trustworthiness of the data and the manner in which the data is handled in the computing network. Many entities have no way to ascertain whether the computing network or portions thereof are trustworthy. Even if mechanisms exist to improve the trustworthiness of the computing network, entities may be unaware of these mechanisms and are, as a result, unable to benefit from those mechanisms. Further, an application does not have visibility into how or why a computing network can improve the confidence of the application in the network and/or data flowing through the network.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to ecosystems such as data confidence fabrics (DCFs) and to performing trust operations therein. In one example, a DCF is a system of hardware (computers, servers, routers, network interface cards, storage including immutable storage) that is provisioned to score or rank data that may be ingested into the DCF. The data ingested into the DCF can be made available to applications, which may also be part of the DCF. The DCF may include one or more networks including local area networks, wide area networks, telecommunication networks, or the like or combination thereof.

In one example, a DCF, by way of example and not limitation, may relate to both hardware and/or software and/or services. A DCF is an example of an architecture and set of services that allow data to be ingested into a system for use by applications. The DCF adds or provides trust information or scores to the data as the data flows through the DCF. Ultimately, the ingested data is associated with a trust or confidence score that provides a view into the trustworthiness of the data to an application or other use.

Embodiments of the invention relate to performing trust operations in computing networks that already include a DCF and in computing networks that do not includes a DCF or an active DCF. Examples of trust operations include performing a network analysis that is able to identify trust insertion technologies, determining a baseline trustworthiness of a network, recommending improvements that increase the trustworthiness of the DCF in the computing network, and implementing these improvements and improvement technologies.

More particularly, at least some embodiments of the invention relate to systems, hardware, software, computer-readable media, and methods for evaluating data confidence fabrics and to improving data confidence fabrics. Embodiments of the invention further relate to a DCF trust broker configured, by way of example and not limitation, to analyze, identify, implement, install, and/or broker trust insertion technologies.

The following disclosure discusses trust insertion in a DCF prior to discussing DCF brokering. As data flows from data sources to storage or to applications in a DCF ecosystem, scores can be attached to or associated with the data. As the data flows in the DCF, different forms of trust insertion technology handle or process the data. As the data is handled by various forms of trust insertion technology, the overall score or ranking (e.g., a confidence or trustworthiness score) of the data may change. The data scored or ranked in the DCF system may be stored in various locations, such as a data lake, in a datacenter, in a distributed ledger, or the like. The data scored or ranked in the DCF system can be made available to one or more applications or other clients or users.

By ranking or scoring data, an application is able to explore or exploit the data for potential analysis or consumption. The score or rank of the data allows an application to understand or account for the trustworthiness of the data. For example, the confidence score of the data may have a significant impact on whether the data is actually used by the application. An application may require a minimum confidence score or have other requirements related to the confidence score.

For example, an application operating in a secure facility may need to use data that is very trustworthy (have a high confidence score) while data that is used by an application to control lights in a home may not need to be as trustworthy (a lower confidence score is acceptable). A DCF is able to give or associate data with scores from individual trust insertion technologies that can be combined in multiple ways to determine a final score or rank that relates to the trustworthiness of the data.

Figure 1:
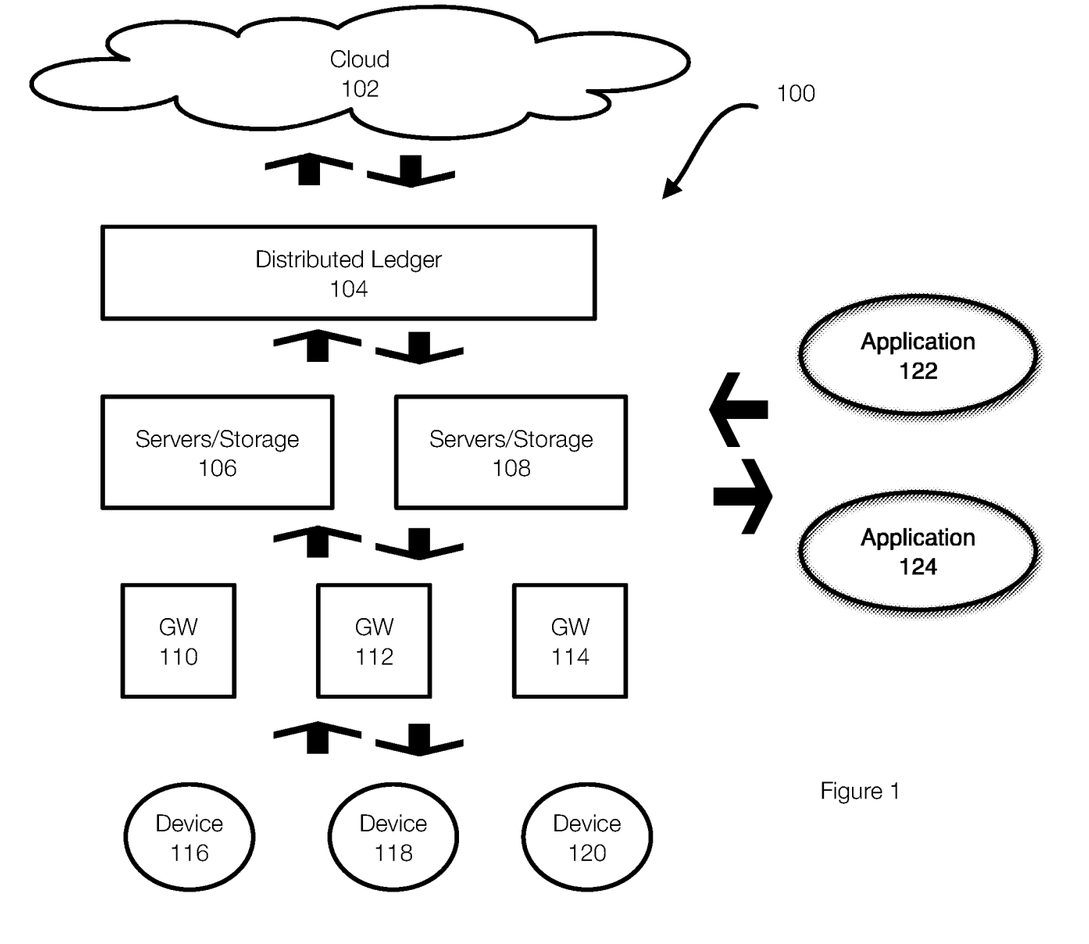
FIG. 1 illustrates an example of a network in which data flows.

FIG. 1 illustrates an example of a computing network that does not include or implement a DCF. However, the computing network shown in FIG. 1 may still include trust insertion technologies. FIG. 1 illustrates an example of a computing network 100. The network 100 may include different network types including Internet capable networks, edge computing networks, cellular or telecommunications networks or the like.

FIG. 1 illustrates devices 116, 118, and 120. These devices 116, 118, and 120 may generate data that is ingested into the network 100. For example, the devices 116, 118, and 120 may be sensors, smartphones, edge devices, or other data sources. The data generated by the devices 116, 118, and 120 may depend on various factors and purposes. For example, the device 116 may be a smartphone device that is capable of generating a wide variety of data. In one example, location related data generated by the device 116 may be useful to the application 122 if the application 122 is a map generating application. If the device 118 is a weather sensing device, the data produced by the device 118 may be useful to a weather related application such as the application 124. Embodiments of the invention thus relate to a wide variety of devices, applications, and networks.

The data generated at the devices 116, 118 and 120 may be ingested through a gateway, such as the gateways (GWs) 110, 112 and 114. A gateway, by way of example only, may be configured to receive data from devices such as edge devices and perform processing on the data. The gateways 110, 112, and 114 may deliver the data to servers/storage 106 and 108. The servers can store the data, perform processing, or the like. The network 100 may be associated with a distribute ledger 104 that allows data to be recorded more securely. The cloud 102, which may include multiple clouds from different providers, may also provide other processing, storage, and computing resources. The applications 122 and 124 can be distributed in the network 100 and operate at different levels and/or locations.

In one example, a data confidence fabric has not been implemented in the network 100. As a result, the applications 122 and 124 may interact with edge data from the devices 116, 118 and 120 without knowledge of the trustworthiness (e.g., a confidence score) of the data being ingested into the network 100. More specifically, at each layer of the network 100, data and applications are being brought together with unknown confidence in this example. In one example the network may actually include trust insertion technologies, but it is not clear whether these different forms of trust insertion technologies are being used. Embodiments of the invention provide a broker engine that is configured to gauge a current confidence level or trustworthiness of the network 100 and develop a plan to increase that confidence level.

When implementing a DCF, trust insertion technologies are examples of tools that can be used to increase the confidence in edge data. Examples of trust insertion technologies include, but are not limited to, hardware root of trust capabilities, co-processors and accelerators, digital signatures, identity management, secure ingest software, encryption, immutable storage, data protection policies, distributed ledgers, or the like or combination thereof.

The number and type of trust insertion technologies is large and each may be associated with a different trust increase. Differences or disparities in the trustworthiness of these technologies can impact the overall trustworthiness of the DCF. Some components or technologies are better able to insert or add trust to data flowing in the network.

Figure 2:
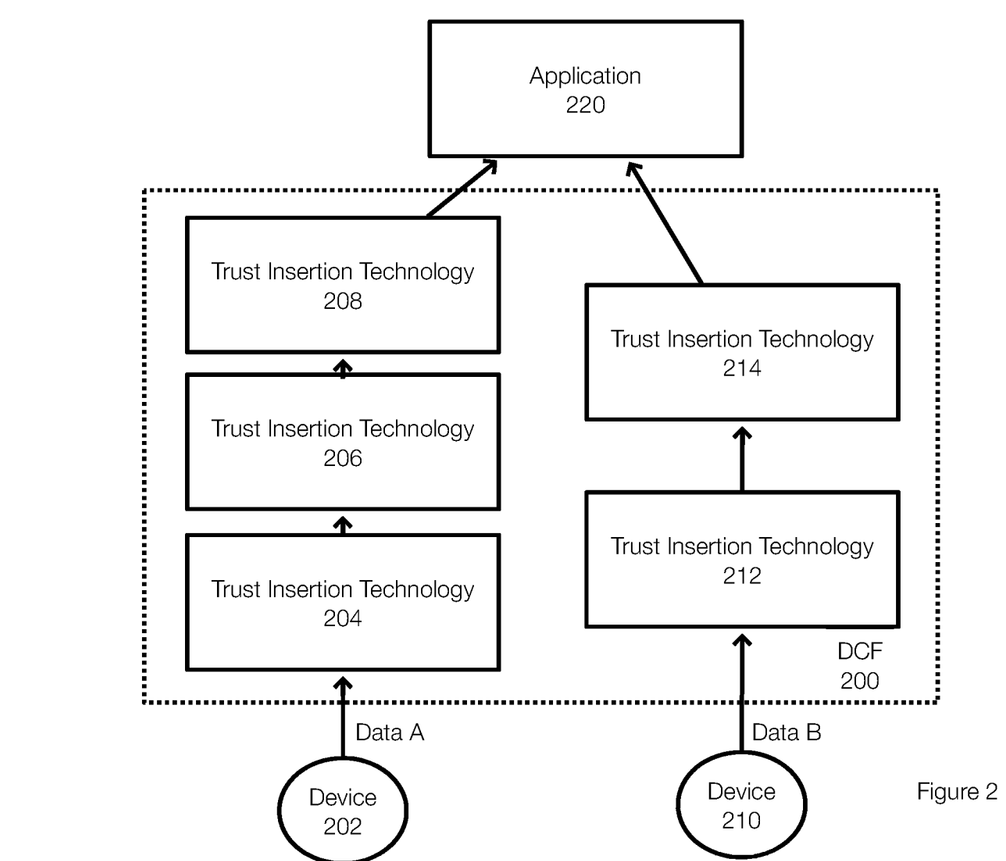
FIG. 2 illustrates an example of a network in which data flows and in which the trustworthiness of the data is measured and tracked.

When a DCF is implemented, however, the trustworthiness of the data is improved. FIG. 2 illustrates an example of data that flows through a network in which a DCF has been implemented. FIG. 2 may correspond to the network of FIG. 1 after implementation of a DCF.

In FIG. 2, data A is generated by a device 202 and data B is generated by a device 210. The devices 202 and 210 may by any type of device that generates data. Example devices include sensors, computing devices such as smartphones, laptops, and other devices. IoT (Internet of Things) capable devices are also examples of the devices 202 and 210. The data A and the data B are ingested into a DCF 200 and flow through the DCF 200. In one example, the devices 202 and 210 and the application 220 may be part of or associated with the DCF 200. After flowing through the system, the data A and the data B may be stored in a repository that can be accessed by the application 220. The data A and the data B may also be stored at various locations while flowing through the DCF 200.

The DCF 200 may be implemented on a wide variety of devices and networks. When data is collected on an edge of a network, the data may flow through various levels of hardware environments that have various levels of processing, memory, and storage capabilities. From a hardware perspective, the data may flow from the data-generating device 202 to a server computer or to a gateway device. The server computer or gateway may send the data to another server that is configured to aggregate data from multiple gateways. That server may send the data to a storage environment where the data can be accessed and used by applications. In this path, different devices, services, or applications may handle or process the data. Typically, each interaction with the data may be associated with a trust insertion, where trust metadata is inserted with or associated with the ingested data. When the data reaches the application or is stored, the data is thus stored or associated with a trust or confidence score and/or metadata used to determine or calculate the trust or confidence score. The data and/or the associated score may be scored immutably.

In this example of FIG. 2, each of the devices and/or services and/or applications that handle the data may adjust or change the trustworthiness of the data. This is often achieved by contributing to the score of the data. More specifically, in one example, this is achieved by providing a score that impacts the trustworthiness score or rank of the data. Typically, the scores are cumulative: each trust insertion technology contributes to the overall confidence score. Embodiments of the invention allow the score or rank to be computed using more than simple addition. Other formulations may also be implemented, such as multiplication, addition, weighting, and/or combination thereof or the like.

In FIG. 2, the data A may be handled or processed by three different trust insertion technologies 204, 206 and 208 in this example. The DCF 200 can have any number of trust insertion technologies. The data B may be handled or processed by two different trust insertion technologies 212 and 214. In this example, the score or rank of the data A may be higher than the score or rank of the data B. From the perspective of the application 220, the data A may be more trusted than the data B. However, this may depend on the specifics of the trust insertion technologies. For example, a score provided by the trust insertion technology 214 may by substantially higher or heavily weighted. This may influence the overall score or rank of the data B.

Alternatively, if the trust insertion technologies 204 and 206 are the same as the trust technologies 212 and 214, the score or rank of the data A is likely to be higher than the score of the data B because the data A is also scored or ranked by the trust insertion technology 208. The score or rank of the data can be impacted as well by various factors including characteristics of the trust insertion technologies, failures/successes associated with the trust insertion technologies, or the like.

In the ecosystem illustrated in FIG. 2, embodiments of the invention allow a score to be computed using different calculations. The overall score can be determined from the individual scores using addition, multiplication, weighting, other scoring algorithms, or the like or combination thereof.

Generally, the addition of trust components or trust insertion technologies are associated with a cost or impact to an entity. The cost can come in various forms including a resource cost, an economic cost, and a time cost. For example, time may be needed for purchasing or selecting technologies, downtime for installation, or the like. Further, the entity has no way to understand the cost associated with raising the trustworthiness of a given computing network. In addition, adding, configuring, or adjusting trust insertion technologies can introduce delay into a system. In other words, the performance of the system may experience a latency penalty as the data flows in the network.

Embodiments of the invention assist an entity to understand the consequences (e.g., in terms of performance, cost, etc.) of activating, adding, upgrading, improving and/or providing trust insertion technologies. Embodiments of the invention help an entity install a DCF, upgrade or increase the trust of an existing DCF, maintain the DCF while balancing the cost, performance and value of the DCF.

Figure 3:
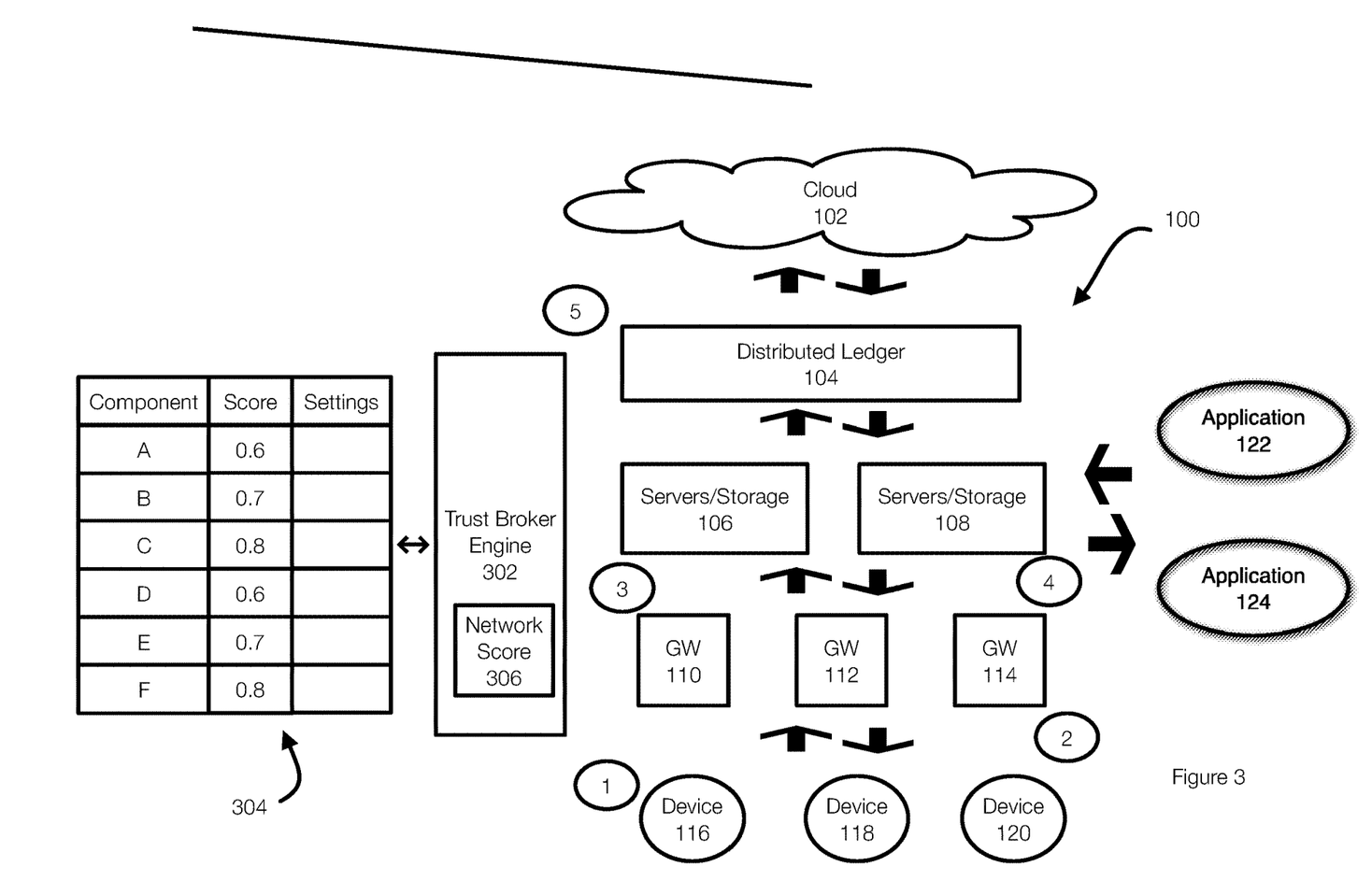
FIG. 3 illustrates an example of a trust broker engine configured to perform trust related operations in a computing network including trust evaluation and trust improvement operations.

FIG. 3 illustrates an example of a trust broker that is configured to perform trust operations that may include evaluating a network's current trust insertion technologies, install or upgrade trust insertion technologies, improve the trust of a DCF, or the like or combination thereof.

FIG. 3 illustrates a trust broker engine 302, which is an example of a trust broker that is configured to install a new DCF, upgrade or increase trust in an existing DCF. The trust broker engine 302 is associated with a catalog 304 or other database. The catalog 304 stores information about trust insertion components or technologies. The catalog 304, which is represented in table form in FIG. 3, associates components or trust insertion technologies with scores and settings/descriptions.

When the trust broker engine 302 is performing operations on the network 100, the catalog 304 may be used. More specifically, the catalog 304 may be used to scan, sort, reconfigure an edge deployment, or the like, with the purpose of improving confidence in a DCF that has been implemented in a computing network.

The trust broker engine 302 is also configured to probe or evaluate the network 100 for the purpose of discovering existing trust insertion technologies. This allows the trust broker engine 302 to determine a network score 306. In one example the trust broker engine 302 may determine multiple scores, which are represented by the network score 306.

In one example the score 306 is an example of a rating or a baseline score of the network 100. More specifically, the trust broker engine 302 may determine a baseline score of the network during an initial analysis. The trust broker engine 302 can then identify potential ways or recommendations to improve the score. If these recommendations are implemented, the trust broker engine 302 may then measure or determine a current score. Comparing the current score to the baseline score results in a measurable increase in trustworthiness.

For example, the trust broker engine 302 may scan or probe the network for trust insertion technologies. The trust broker engine 302 may discover that there are trust insertion technologies already present in the network 100. These trust insertion technologies are labeled 1, 2, 3, 4, and 5. By way of example, the trust insertion technologies that already exist include: 1 the devices are signing their data (hardware root of trust signatures on device data); 2 the ingest software rejects non-authorized/non-authenticated application access to the data (strong N-S-E-W authentication/authorization); 3 provenance metadata is appended to the data from the devices (provenance metadata attachment such as information about a data capture environment); 4 data is stored onto a cryptographically-protected object store (secure immutable scale-out edge persistence); and 5 a record of the data/metadata is registered in a distributed ledger (e.g., registration of trusted assets in a multi-cloud distributed ledger).

The trust broker engine 302 may determine that these trust insertion technologies 1, 2, 3, 4, and 5 are present in the network 100, but are not actively being measured or are not actually being used. The trust broker engine 302 can be positioned or installed at multiple locations within the network 100. The trust broker engine 302 may be a portal, a node installed inside a firewall, on one or more of the gateways 110, 112 and 114, on edge nodes 106, 108 or in the cloud 102.

Once the trust broker engine 302 has discovered the trust insertion technologies 1-5, the trust broker engine 302 can determine a baseline score for the DCF implemented in the network 100.

More specifically, DCF trust broker engine 302 can take configurations of the discovered trust insertion technologies (e.g., features 1-5) and attempt to create a baseline or trustworthiness score based on the current trust capabilities of the network 100. If there is currently no DCF scoring (no score 306) in place, the trust broker engine 302 creates a "goal score" (and sets the baseline to "0" or "N/A"). If the trust broker engine 302 is inspecting an existing DCF, the trust broker engine 302 may establish a baseline.

The network score 306 or DCF score, which may be a confidence or trustworthiness score, can be calculated by mapping the features 1-5 to the catalog 304. More specifically, the trust insertion technology 1 can be compared against the entries in the catalog 304. In one example, the trust insertion technology may map to components B and E in the catalog 304. This association can be determined by exploring the settings 304 (which may also include a description of the technology) and looking for descriptions of components that perform signatures. In another example, the component E may be identical to the trust insertion technology 1 in the network. In both cases, a trustworthiness or confidence score can be determined or estimated for each of the trust insertion technologies.

A similar process is performed for all of the trust insertion technologies 1-5. The scores associated with the identified components in the catalog 304 can be combined or integrated into a baseline score (which may be an estimate at least initially). The overall score 306 can be determined from the scores of the technologies using a scoring algorithm (e.g., a weighted average or sum). This results in a score 306, which is a baseline score or estimate of the trust of the DCF implemented in the network 100 in one example. In this example and depending on the scoring algorithm the score may range between 0 and 1, with 1 being the most trustworthy. The scores may be based on other ranges and may be normalized.

Figure 4:
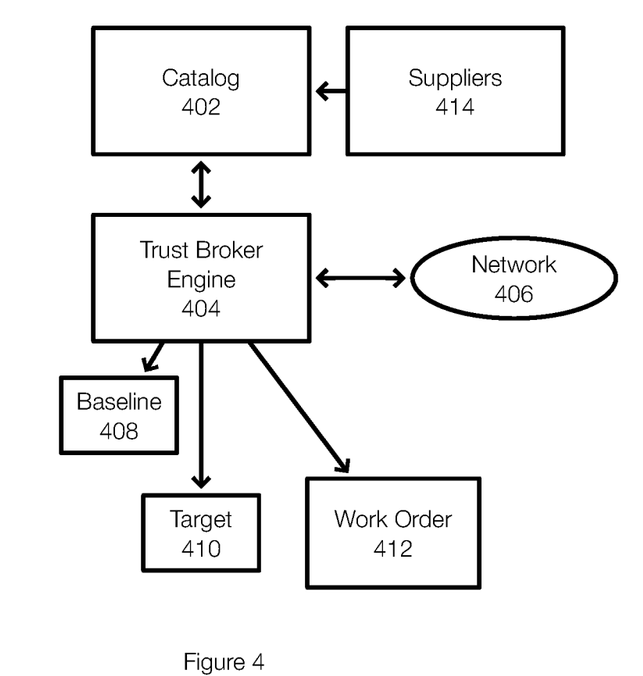
FIG. 4 illustrates an example of a trust broker engine that performs trust related operations including a workflow generation to measurably improve trust.

FIG. 4 illustrates that the trust broker engine is configured to determine confidence scores and/or generate plans or configurations for increasing or improving confidence scores for data flowing through a DCF. The trust broker engine 404, which is an example of the trust brokers discussed herein, may perform an analysis of a network 406 (which may or may not include a DCF). Using the catalog 402, the trust broker engine 404 can determine scores for individual trust insertion technologies in the network 406 and generate a baseline confidence score 408.

With this information, the trust broker engine 404 may also generate a target confidence score 410. The target confidence score 410 may be based on the analysis performed by the trust broker engine 404 and based on trust insertion technologies identified in the catalog 402 that could be implemented in the network 406.

By way of example only, the confidence or trustworthiness score of a network can be improved by changing setting of existing trust insertion technologies, turning existing trust insertion technologies operational, performing software upgrades, adding trust insertion technologies (hardware and/or software), or the like or combination thereof. This allows the trust broker engine 404 to identify a target score 410, which may represent what the confidence or trustworthiness of the network 406 could be. In fact, a range of target scores 410 could be generated.

In addition to the target score 410, the trust broker engine 404 may present a plan, such as work order 412 that, if implemented, may raise the baseline score 408 to the target score 410. Thus, an entity may have the ability to select or implement a variety of plans, each of which may improve the trustworthiness of the network 406.

The workorder 412 may identify areas of the network 406 in which trust insertion technologies can be added and from which a score can be determined. The workorder 412 may identify improvement in existing trust insertion technologies. In both cases, the anticipated increase in the confidence score can be determined. The anticipated increase, plus the baseline score 408 correspond to the target score 410 in one embodiment.

The work order 412 may also aid an entity in balancing the task of improving the confidence score with network impacts such as delays and latency. In one example, the delays associated with certain trust insertion technologies may be identified in the catalog 402 and can be presented in the work order 412. This provides an entity with information that allows the entity to balance trust with cost and performance.

For example, a list of potential performance delays as a result of adding, upgrading, etc., the trust insertion technologies or other logic may be identified in the workorder 412. These delays may be listed in any given row of a trust component table (e.g., the catalog 402) for any given component.

The work order 412 may also identify a cost associated with improving the confidence score associated with the network 406. This may be a cost for services to implement the workorder (e.g., licenses, hardware, software, installation, maintenance, etc.). Alternatively, the trust broker engine 404 or other engine may be engaged as a trust as a service such that cost is based on a time or consumption (e.g., byte) basis.

The workorder 412 may also facilitate forming a formal engagement and may constitute a smart contract. Once the workorder 412 is approved or accepted, the trust broker engine 404 ay proceed with installing, configuring, upgrading the relevant trust insertion technologies within the relevant environment, such as the network 406, in accordance with the work order 412. For example, the trust broker engine 404 may install taps that allow the trust flowing across the environment to be measured or may install trust insertion technologies, upgrade trust insertion technologies, or the like. Once the installation is complete, the trust broker engine 404 may monitor the DCF to ensure that the baseline score moves toward the target score or other threshold or improvement.

The trust broker 404 may also be configured to communicate with various suppliers 414 of trust insertion technologies. Offers or other information from those suppliers may be stored in the catalog 402. The suppliers 414 may also be able to update their information in the catalog 402. In one example, the suppliers 414 may register with the trust broker engine 404 such that their information can be updated or added to the catalog 402. For example, the suppliers 414 may identify a component, a score, performance latencies, and other relevant information. Payment information may also be provided such that the cost of a particular trust insertion technology is known and can be used by an entity deciding whether to improve the confidence of their DCF. The payment methodology may also be specified.

Figure 5:
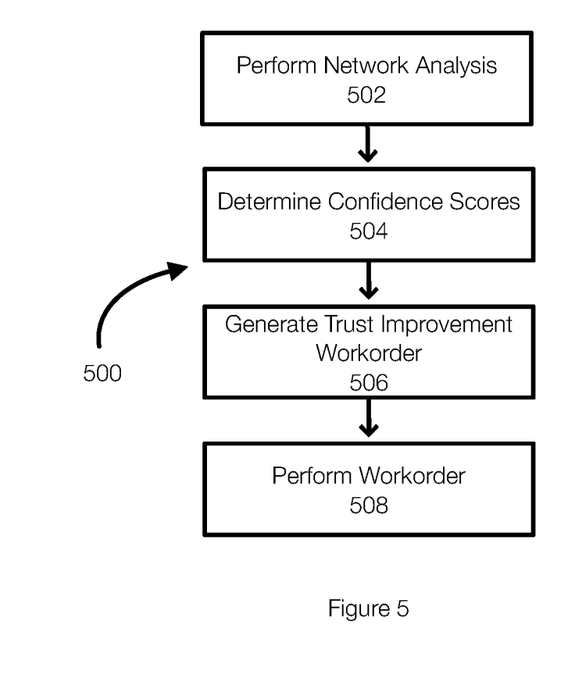
FIG. 5 illustrates an example of a method for performing trust operations in a computing network.

FIG. 5 illustrates an example of a method for performing trust broker operations. The method 500 may begin by performing 502 a network analysis. Performing a network analysis may include evaluating one or more layers and devices of a computing network to determine whether the layers, devices, servers, or other components have the ability or are configured to insert and/or score trust. This may include identifying known trust insertion technologies or the like.

Next, confidence scores are determined 504. This may be performed on a per trust insertion technology basis. In one example, this is achieved by mapping the trust insertion technologies to scores stored in a catalog. Various methods may be used for accessing the table. For example, if an exact match is found in the table, the corresponding score is used. If the trust insertion technology maps to multiple entries in the table, all scores or a combination of the scores (e.g., an average) may be used. Once all trust insertion technologies are mapped, an overall score, which is an example of a baseline score, may be determined.

Next, a trust improvement workorder is generated 506. The workorder 506 may identify ways to improve the trust score of the network. This may include upgrading existing technologies, making existing trust insertion technologies operations, adding new trust insertion technologies, and/or adding DCF scoring capabilities by installing a DCF framework. These possibilities are included in the workorder. In addition, the workorder may also identify potential latencies introduced by the items in the workorder and the cost of the entries in the workorder.

If approved, the workorder is performed 508. This includes performing all or some of the entries in the workorder. Performing the workorder may also include measuring the new trust such that the measurable increase can be verified. Performing the workorder may include installing taps or the like to measure the trust added to data flowing the in network.

Performing 508 the workorder can also result in automatic payment for the improvements. In addition, this payment can cascade to the suppliers 414 automatically as well. More specifically, the suppliers 414 can register with the trust broker and payment information can be included in the catalog 402. This allows for payment to be made to suppliers when the workorder is accepted and performed. Payment can also be made to the trust broker.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, trust and trust-related operations.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients or applications that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or containers, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising performing an analysis of a network to identify trust insertion technologies present in the network, determining a confidence score for each of the trust insertion technologies and determining a network confidence score for the network from the confidence scores of the trust insertion technologies, generating a workorder to improve the network confidence, wherein improvement is measurable, and performing the workorder.

Embodiment 2. The method of embodiment 1, wherein performing an analysis includes identifying the trust insertion technologies using a catalog and providing the confidence score for the trust insertion technologies from the catalog.

Embodiment 3. The method of embodiment 1, and/or 2, wherein the catalog includes relations between the confidence scores, the trust insertion technologies, settings of the trust insertion technologies, and descriptions of the trust insertion technologies.

Embodiment 4. The method of embodiment 1, 2, and/or 3, wherein the workorder includes one or more of adding new trust insertion technologies to the network, upgrading the existing trust insertion technologies, changing settings of the existing trust insertion technologies, maintaining the trust insertion technologies improved in the work order.

Embodiment 5. The method of embodiment 1, 2, 3, and/or 4, wherein the workorder further includes latencies associated with the trust insertion technologies and or improving the trust of the network, and includes a cost associated with improving the trust of the network.

Embodiment 6. The method of embodiment 1, 2, 3, 4, and/or 5, further comprising implementing the workorder in full or in part.

Embodiment 7. The method of embodiment 1, 2, 3, 4, 5, and/or 6, further comprising installing one or more taps in the network to measure trust added by the workorder to the network.

Embodiment 8. The method of embodiment 1, 2, 3, 4, 5, 6, and/or 7, further comprising setting a target network confidence score.

Embodiment 9. The method of embodiment 1, 2, 3, 4, 5, 6, 7, and/or 8, further comprising measuring the network confidence score after implementing the workorder to measure the improvement.

Embodiment 10. The method of embodiment 1, 2, 3, 4, 5, 6, 7, 8, and/or 9, wherein the workorder comprises a smart contract or another payment methodology.

Embodiment 11. The method of any of embodiments 1-10, wherein the method is performed by a client, a server, a virtual machine, a container or the like.

Embodiment 12. A non-transitory storage medium having stored therein instructions that are executable by one or more hardware processors to perform the operations of any one or more of embodiments 1 through 11.

Embodiment 13. Any of the embodiments 1-12 or portions thereof and/or any of the elements disclosed in the discussion.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM) or a container, that VM may constitute a virtualization of any combination of the physical components disclosed herein.

A physical computing device may include a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing an analysis of a network to identify trust insertion technologies present in the network, wherein the trust insertion technologies are identified using a catalog;
determining a confidence score for each of the trust insertion technologies, wherein the confidence score for each of the trust insertion technologies is provided from the catalog;
determining a network confidence score for the network from the confidence scores of the trust insertion technologies;
generating a workorder to improve the network confidence, wherein improvement is measurable; and
performing the workorder.

2. The method of claim 1, wherein the catalog includes relations between the confidence scores, the trust insertion technologies, settings of the trust insertion technologies, and descriptions of the trust insertion technologies.

3. The method of claim 1, wherein the workorder includes one or more of adding new trust insertion technologies to the network, upgrading the existing trust insertion technologies, changing settings of the existing trust insertion technologies, maintaining the trust insertion technologies improved in the work order.

4. The method of claim 3, wherein the workorder further includes latencies associated with the trust insertion technologies and or improving the trust of the network, and includes a cost associated with improving the trust of the network.

5. The method of claim 1, further comprising implementing the workorder in full or in part.

6. The method of claim 5, further comprising installing one or more taps in the network to measure trust added by the workorder to the network.

7. The method of claim 6, further comprising setting a target network confidence score.

8. The method of claim 7, further comprising measuring the network confidence score after implementing the workorder to measure the improvement.

9. The method of claim 1, wherein the workorder comprises a smart contract or other payment methodology.

10. A non-transitory storage medium having stored therein instructions that are executable by one or more hardware processors to perform operations comprising:
performing an analysis of a network to identify trust insertion technologies present in the network, wherein the trust insertion technologies are identified using a catalog;
determining a confidence score for each of the trust insertion technologies, wherein the confidence score for each of the trust insertion technologies is provided from the catalog;
determining a network confidence score for the network from the confidence scores of the trust insertion technologies;
generating a workorder to improve the network confidence, wherein improvement is measurable; and
performing the workorder.

11. The non-transitory storage medium of claim 10, wherein the catalog includes relations between the confidence scores, the trust insertion technologies, settings of the trust insertion technologies, and descriptions of the trust insertion technologies.

12. The non-transitory storage medium of claim 10, wherein the workorder includes one or more of adding new trust insertion technologies to the network, upgrading the existing trust insertion technologies, changing settings of the existing trust insertion technologies, maintaining the trust insertion technologies improved in the work order.

13. The non-transitory storage medium of claim 12, wherein the workorder further includes latencies associated with the trust insertion technologies and or improving the trust of the network, and includes a cost associated with improving the trust of the network.

14. The non-transitory storage medium of claim 10, the operations further comprising implementing the workorder in full or in part.

15. The non-transitory storage medium of claim 14, the operations further comprising installing one or more taps in the network to measure trust added by the workorder to the network.

16. The non-transitory storage medium of claim 15, the operations further comprising setting a target network confidence score.

17. The non-transitory storage medium of claim 16, the operations further comprising measuring the network confidence score after implementing the workorder to measure the improvement.

18. The non-transitory storage medium of claim 10, wherein the workorder comprises a smart contract or other payment methodology.

* * * * *